United States Patent [19]

Basu

[11] 4,304,825
[45] Dec. 8, 1981

[54] RECHARGEABLE BATTERY
[75] Inventor: Samar Basu, Somerset, N.J.
[73] Assignee: Bell Telephone Laboratories, Incorporated, Murray Hill, N.J.
[21] Appl. No.: 208,878
[22] Filed: Nov. 21, 1980
[51] Int. Cl.$^3$ .............................................. H01M 4/36
[52] U.S. Cl. ................................... 429/103; 429/112; 429/199; 429/218
[58] Field of Search ................ 429/103, 112, 199, 218

[56] References Cited

U.S. PATENT DOCUMENTS

| | | | |
|---|---|---|---|
| 4,041,220 | 8/1977 | Armand | 429/218 X |
| 4,087,591 | 5/1978 | Bowers et al. | 429/103 X |
| 4,145,483 | 3/1979 | Bonnemarz | 429/103 |
| 4,172,926 | 10/1979 | Shimotake et al. | 429/12 |

OTHER PUBLICATIONS

Materials Science & Eng. "Synthesis & Prop. of Lithium–Graphite Intercalated Compounds," vol. 38, 1979, pp. 275–283.
Carbon, "Alternate Synthesis & Reflectivity Spectrum of Stage 1 Lithium–Graphite Intercalation Compound", vol. 16, 1978, pp. 211–212.

*Primary Examiner*—Charles F. LeFevour
*Attorney, Agent, or Firm*—Walter G. Nilsen

[57] ABSTRACT

A molten salt cell is described in which a special material is used as the active material in the negative electrode. Such active material permits extensive cycling of the battery and does not significantly alter cell voltage. Molten salt cells made in accordance with this invention exhibit high energy content and high discharge rates. In addition, they can be cycled extensively without significant loss of capacity.

8 Claims, 3 Drawing Figures nal formula $LiC_6$ is then incorporated into the negative electrode structure. Preferably, the electrode should contain at least 10 weight percent $LiC_6$.

The remainder of the high temperature cell is conventional. Any positive electrode with active material may be included in the cell, provided it is compatible with the lithium-ion containing molten salt electrolyte. Particularly useful are electrodes made of $NbSe_3$, $CuS$, $NbS_2$, $FeS$, $FeS_2$, and $TiS_2$. Various positive electrodes have been described in U.S. Pat. No. 4,172,926, issued to H. Shimotake et al on Oct. 30, 1979.

These electrodes are immersed in an electrolyte made up of a fused salt. Any molten salt containing lithium ions which is stable and is compatible with the remainder of the battery cell may be used. The compound LiCl is very useful. Where battery operating temperature is to be reduced, various eutectic compositions are used (i.e., 42 mole percent KCl, remainder LiCl which melts at about 352 degrees C.). Three component systems (i.e., KCl, NaCl, LiCl) may also be used.

In compact cell design, it is useful to use separator material to protect against electronic conduction between closely packed positive and negative electrodes. The separator material should be compatible with the electrode and electrolyte materials, have good wetability by the electrolyte, reasonable mechanical strength and low cost. In addition, the separator material should have good electrical insulating properties at the (high) temperatures used in the battery operation and reasonable porosity and thickness. Any material meeting these qualifications may be used as separation material. Typical examples are boron nitride cloth and stabilized zirconium oxide cloth.

Operating temperature of the battery may vary over fairly large limits, provided electrode materials remain stable and electrolyte is molten. Typical operating temperatures are between 375 and 500 degrees C., although lower and higher temperatures may be used under special circumstances.

A description of the Figures is useful in an understanding of the invention.

FIG. 1 shows a sectional view of a high temperature cell 10 with cell container 11 and negative electrode 12 located on each side of a positive electrode 13. The negative electrode is lithium intercalated in graphite in accordance with the invention. A typical positive electrode is made from $FeS_2$. The positive battery post 14 is connected through a seal 15 to a current collector 16 dispersed through the positive electrode 13. The positive and negative electrodes are separated from one another by a separator material 17 which is insulating to electronic conduction but allows diffusion of electrolyte through it.

FIG. 2 shows a test facility 20 for testing the voltage and electrochemical current characteristics of various negative electrode materials in both oxidation and reduction reactions. An electrolyte 21 is contained in a vessel 22 made of stainless steel. A typical electrolyte is a mixture of LiCl and KCl, which corresponds to the eutectic mixture (approximately 42 mole percent KCl, remainder LiCl) of these salts. Two electrodes are contained in the electrolyte, one electrode 23 made of pure lithium with a nickel sponge to give rigidity and collect current (Li electrode), and the other electrode 24 made from lithium-graphite material ($LiC_6$ electrode). The electrodes are held in place by means of stainless steel rods 25 which also serve as electrical contacts. They pass through alumina electrical insulators 26 which insulate the rods 25 from the stainless steel cover 27. The entire cell with container, etc., is located inside a furnace with heater wire 28. The temperature is monitored with a thermocouple 29.

FIG. 3 shows a graph of cell voltage vs. time exhibited by the cell described in FIG. 2 for various current densities in each direction. The experiment was carried out with a cell temperature of approximately 375 degrees C. Cell voltage was measured across the electrode supports 25 shown in FIG. 2. The capacity of the pure lithium metal electrode is made quite large compared to the capacity of the lithium-graphite electrode so that the voltage characteristics of the cell do not show effects of overcharge or overdischarge of the pure lithium electrode. The voltage is measured in such a way as to indicate the potential of the pure lithium cell minus the potential of the lithium-graphite cell. Initially, the cell voltage was about 35 millivolts (point 31 on the graph). First, the cell was cycled by passing current through the cell in such a way as to convert lithium metal to lithium ions in the lithium-graphite cell. This current direction is referred to as the forward direction in this application. The current density was 4 ma/cm$^2$ and the initial high voltage is due to polarization effects of films on the surface of the active electrode materials. After about two hours (point 32 on the graph), the current was reversed and increased to 6 ma/cm$^2$. This corresponds to converting lithium ion (Li$^+$) to lithium metal at the lithium-graphite electrode (reverse current direction). The plateau extending from about 3.0 to about 4.7 hours (point 33 to point 34) corresponds to lithium ions being converted to lithium metal at the lithium-graphite electrode. At point 34, the current was reversed so that the current is in the forward direction (current density still 6 ma/cm$^2$) and the plateau at 35 represents the difference in potential between pure lithium and lithium-graphite at this current density. This difference in potential is about two millivolts for a current density of 6 ma/cm$^2$ and represents one of the major advantages of the lithium-graphite electrode, namely the electrode potential is practically identical to that of pure lithium.

When most of the lithium metal has been converted to lithium ion in the lithium-graphite electrode (point 36 on the curve) the voltage begins to rise and at point 37 the current was reversed (reverse current direction) and increased to 20 mA/cm$^2$. The voltage then stabilizes at a plateau (point 38 on the curve) which has a somewhat lower voltage than the plateau at point 33 on the curve because of the higher current density. The current was reversed at point 39 so that current was flowing in the forward direction. The current density was lowered to 10 mA/cm$^2$ and the plateau at point 40 represents the electrode voltage of the graphite electrode relative to the pure lithium electrode. Again the electrode voltage was quite low; namely, about 10 millivolts but was slightly higher than the plateau at point 35 on the curve because of the higher current density. The current was reversed at point 41 (reverse current direction) and a plateau observed 42 at a current density of 20 mA/cm$^2$. Again, the current was reversed (to the forward direction) and a plateau 43 observed. The plateau is again slightly higher than the corresponding plateaus observed earlier but again this is due to the higher current density. After further cycling the voltage characteristics were observed at a current density of 40 mA/cm$^2$ and the plateaus at points 44, 45, and 46 corresponding to conversion of lithium metal to lithium ion at the lithium-graphite electrode. Here again the voltage is

RECHARGEABLE BATTERY

TECHNICAL FIELD

The invention relates to molten salt rechargeable batteries.

BACKGROUND OF THE INVENTION

Molten salt batteries are of interest commercially because of their high energy content per unit weight, high cell voltage and high current (energy) delivery capacity. In particular, molten salt batteries with lithium type electrodes exhibit high voltages which result in unusually high capacity per unit weight and unit volume.

Long shelf life is advantageous for many applications, such as where the battery is only used occasionally (e.g., standby sources of power for memories, electronic devices, telephone equipment, etc.) or where the devices are stored for long periods of time before use. Because of high capacities and high discharge rates, molten salt batteries are potentially useful for a large variety of applications. Recent concern about energy shortages suggests the use of such batteries in electric vehicles and as energy storage devices for more efficient use of present energy producing facilities.

A particularly difficult problem associated with molten salt batteries is to obtain a battery design which will be rechargeable without seriously degrading the high capacity per unit weight characteristic of such batteries. In particular, it is desirable for many applications (e.g., electric vehicles and load leveling applications) to have an extensively recyclable battery which will maintain over many cycles its high capacity per unit weight.

SUMMARY OF THE INVENTION

The invention is a molten salt battery cell which has conventional positive electrode and molten salt electrolyte and a negative electrode comprising lithium intercalated graphite.

A particular advantage of lithium intercalated graphite is that the cell voltage remains practically unchanged from that of pure lithium metal alone and the negative electrode is rechargeable. Thus, a secondary battery can be made with minimum reduction in cell capacity and cell voltage.

The ratio of lithium to graphite may vary over large limits, but the mole ratio (of Li/C) from one/six to one/36 is preferred because it yields optimum results. In this range, the lithium electrode is extensively rechargeable with minimum sacrifice in cell capacity. It is believed that the active material in the charged lithium-graphite electrode is $LiC_6$ and that during discharge, other compounds (i.e., $LiC_{18}$) less rich in lithium metal may be formed. Also, in order to increase capacity, lithium metal may be mixed in with $LiC_6$ so as to make an electrode more rich in lithium than indicated by the composition of the compound $LiC_6$.

Typical positive electrode materials are iron sulfide and titanium sulfide. Typical molten salts are binary or ternary mixtures of lithium halides such as lithium fluoride, lithium bromide, lithium chlorides, etc., and potassium chloride or sodium chloride. Eutectics between these salt or pairs of these salts are also useful. Batteries made in accordance with the invention exhibit voltages close to that exhibited by pure lithium batteries and also exhibit high capacities and discharge rates. These batteries are also recyclable, and in particular can be subjected to deep discharges without adverse affect on the battery life.

DETAILED DESCRIPTION

Figure 1:
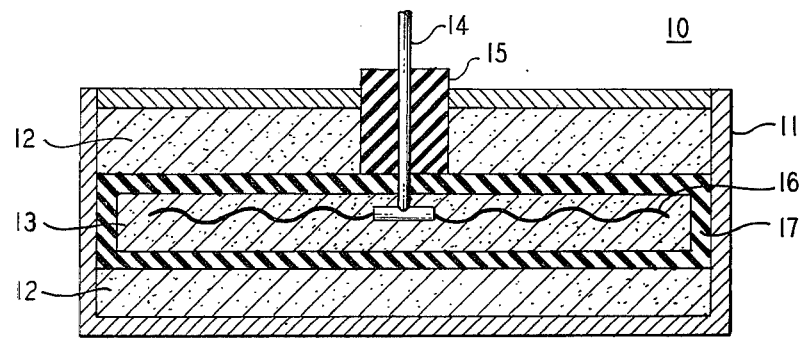
FIG. 1 shows a typical molten salt battery structure including the lithium graphite active material in the negative electrode.
Figure 2:
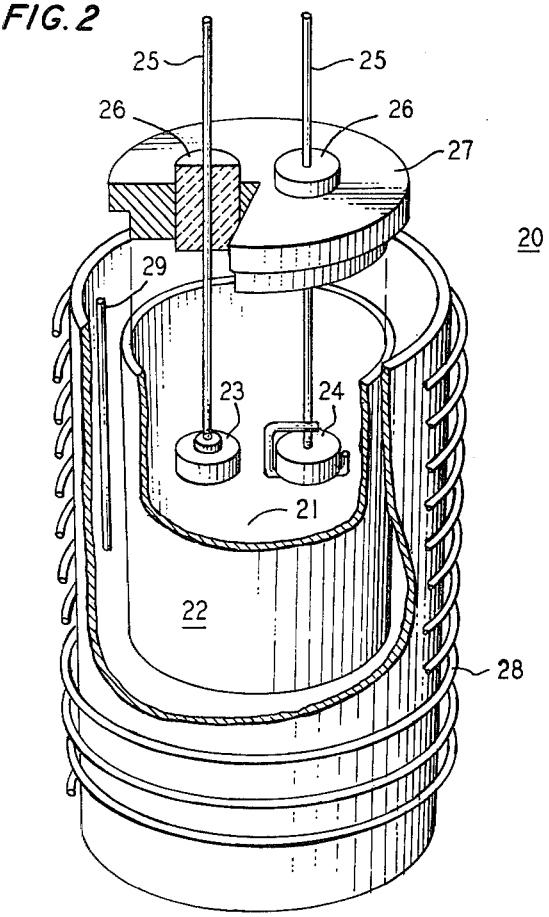
FIG. 2 shows a test facility for measuring the difference in voltage between a pure lithium electrode and lithium intercalated graphite electrode.
Figure 3:
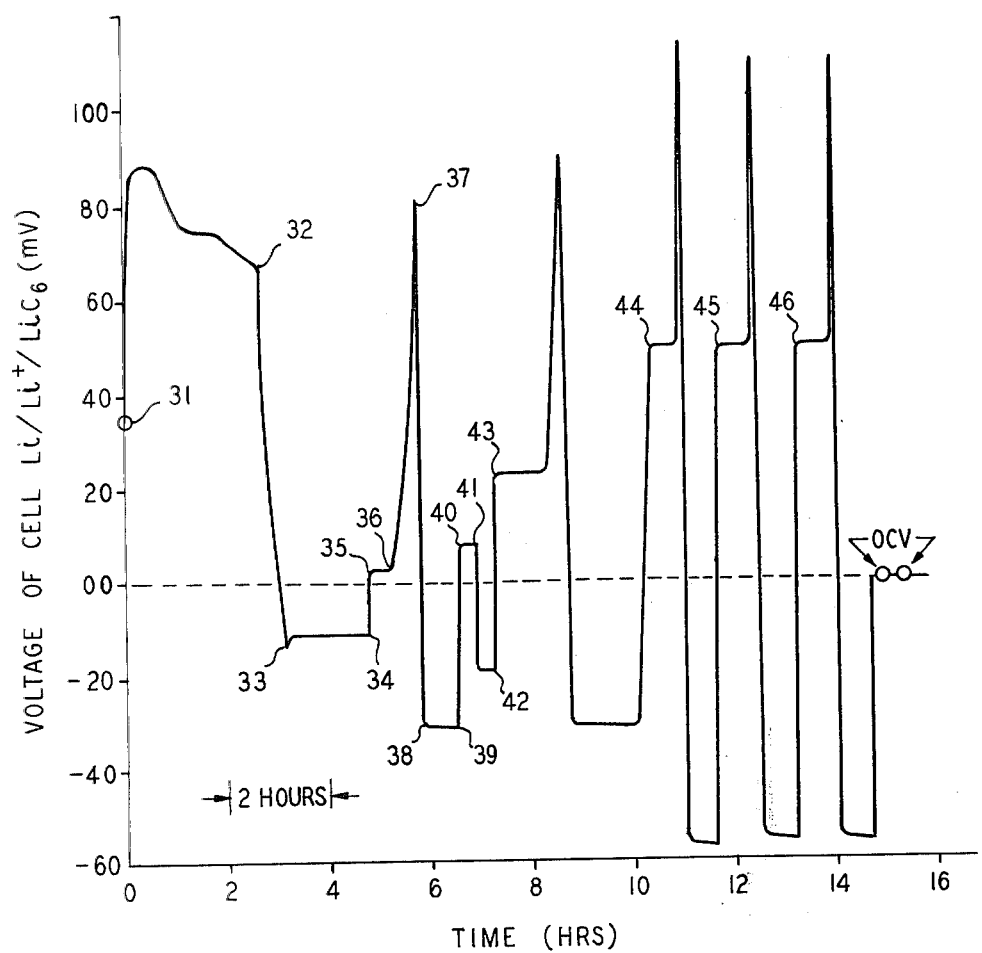
FIG. 3 shows a plot of cell voltage vs. time for a charge-discharge cycling curve.

The invention involves the use of graphite in conjunction with lithium in the negative electrode of a high temperature fused-salt battery. The presence of graphite in the negative electrode permits extensive cycling of the cell. A wide variety of procedures may be used to prepare a lithium-graphite negative electrode. As indicated above, the mere presence of graphite in the electrode will lead to some intercalation of lithium in the graphite. Exposure of lithium metal to graphite prior to introduction into the electrode is also useful. The cell may also be made in the discharged condition with graphite in the negative electrode and charged in such a way that the lithium metal formed during the charging process intercalates into the graphite to form the lithium-graphite material.

It is preferred to combine the lithium and graphite in such a way as to form primarily the richest compound $LiC_6$. This yields maximum capacity and stability consistent with extensive rechargeability.

Particular methods of making lithium intercalated graphite and in particular, $LiC_6$, have been outlined in several references including the following two articles: "Synthesis and Properties of Lithium-Graphite Intercalated Compounds" by S. Basu et al, *Materials Science and Engineering*, 38, (1979), pp. 275–283, and "Alternate Synthesis and Reflectivity Spectrum of Stage 1 Lithium-Graphite Intercalation Compound" by M. Zanini et al, *Carbon* 16, pp. 211–212 (1978).

In general terms, the preparation of the lithium-graphite material involves exposure of graphite (preferably reasonably pure) to molten lithium for sufficient time to form the intercalated material. Usually, excess lithium is used to ensure obtaining the material richest in lithium. The temperature range for reaction may vary over large limits (within the range where lithium is molten), but 180 degrees C. (the melting temperature of lithium) to 450 degrees C. is most convenient. Temperatures above 450 degrees C. are somewhat detrimental to the reaction and are inconvenient. For example, above 450 degrees C., certain lithium-carbon compounds (i.e., $Li_2C_2$) might be formed which might reduce electrode capacity. Care must be used in selecting material for the container, particularly at high temperature. The length of time for carrying out the reaction varies with the reaction temperature and the size of the graphite being reacted. Generally, a reaction time between two hours and four days is used. Shorter time periods lead to incomplete formation of the intercalated compound; larger times do not usually lead to greater yields and is wasteful of time. Excess lithium is usually removed, for example, by shaving off excess lithium after cooling to room temperature. The lithium-graphite material containing at least some $LiC_6$ some compound with nomisomewhat higher than the same plateaus observed earlier but this, again, is due to the higher current density. It should be recognized that voltages in the positive range indicate that the cell potential of the lithium-graphite electrode was lower than the electrode potential of the pure lithium electrode.

The introduction of graphite into the negative electrode makes the electrode reversible and does not significantly decrease the electrode potential compared to pure lithium electrodes.

What is claimed is:

1. A molten salt secondary power supply including at least one cell said cell comprising of electrolyte, negative electrode and positive electrode characterized in that the negative electrode comprises lithium intercalated in graphite.

2. The power supply of claim 1 in which at least 10 weight percent of the negative electrode consists of $LiC_6$.

3. The power supply of claim 1 in which the cell operates at a temperature between 375 and 500 degrees C.

4. The power supply of claim 1 in which the lithium intercalated in graphite is made by exposing graphite to an excess of metallic lithium in the temperature range from 180 degrees C. and 450 degrees C. for a time period between two hours and 4 days.

5. The power supply of claim 1 in which the positive electrode comprises active material selected from the group consisting of $FeS$, $FeS_2$, $TiS_2$, $NbSe_3$, $CuS$ and $NbS_2$.

6. The power supply of claim 1 in which the electrolyte comprises lithium chloride.

7. The power supply of claim 6 in which the electrolyte comprises lithium chloride and at least one compound selected from the group consisting of potassium chloride and sodium chloride.

8. The power supply of claim 7 in which the electrolyte consists essentially of 42±5 mole percent potassium chloride, remainder lithium chloride.

* * * * *